B. V. LOUTZKOY.
PNEUMATIC HUB FOR VEHICLE WHEELS.
APPLICATION FILED MAY 12, 1920.

1,426,887. Patented Aug. 22, 1922.

Inventor:
Boris von Loutzkoy
By C. P. Goepel
Attorney

UNITED STATES PATENT OFFICE.

BORIS V. LOUTZKOY, OF ANDREEWKA, RUSSIA.

PNEUMATIC HUB FOR VEHICLE WHEELS.

1,426,887.                Specification of Letters Patent.    Patented Aug. 22, 1922.

Application filed May 12, 1920. Serial No. 380,948.

*To all whom it may concern:*

Be it known that I, BORIS VON LOUTZKOY, diplom-engineer, a subject of Russia, and residing at Andreewka, Gouvernement Taurien, Russia, have invented certain new and useful Improvements in Pneumatic Hubs for Vehicle Wheels, of which the following is a specification.

The present invention relates to pneumatic cushioned wheels and has for an object to provide an improved construction of device using a piston and a cylinder and which embodies a novel construction of piston which may be made in multiple with a hub and may carry a jacket or covering of suitable wearing material for contact with the inner surface of the cylinder.

Another object of the invention is to provide an improved construction of piston which may be pressed in opposed parts with opposed parts of the hub and later assembled with the hub, and to provide a jacket for surrounding each piston and which at the same time may hold the separable parts together.

A still further object of the invention is to so mount a jacket or cap upon a piston as to provide a rigid structure therewith and which may be easily removed from the piston for renewal or for the purpose of permitting the separation of the parts.

The above and various other objects and advantages of this invention will be in part, described in, and in part understood, from the following detailed description of the present preferred embodiment, the same being illustrated in the accompanying drawings; wherein Fig. 1 is a side elevation partly in section of the hub portion of a wheel constructed according to the present invention and showing four pistons with one in section having the assembled jacket or cap applied thereto;

Figure 3:
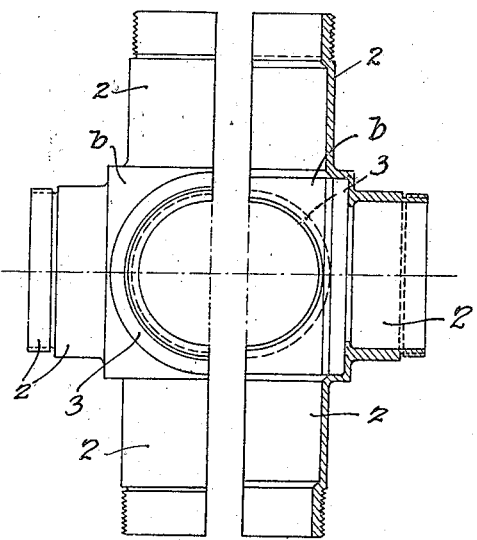
Fig. 3 is a side elevation half in section showing the hub portion with the caps removed.

Referring to the drawing, $b$ designates a hub which, as shown in Fig. 3, may be made in two sections or halves adapted to be joined together to form the complete hub, and which may be pressed, cast or otherwise suitably formed.

The hub $b$ carries a plurality of radially extending pistons $a$ composed of inner parts 2 which are preferably integral with the hub $b$ and which are reduced and externally threaded at their outer ends to receive the assembled caps or jackets 1 which have smooth inner walls for fitting over the inner parts 2 and which are reduced and internally threaded in their outer ends for engaging the threads of the inner parts 2.

The open ends of the jackets 1 are adapted to seat against the sides of the hub $b$ for binding or jamming the jackets in firm position upon the parts 2. The hub $b$ is provided at opposite ends with bearing rings 3 forming packings adapted to support and seal the opposite ends of the hub.

The hub thus constructed is made in two opposed halves with the shanks or inner parts 2 formed in halves so that when the jackets or caps 1 are screwed over the shanks or inner parts 2, the latter are held firmly together, and consequently the hub $b$ is practically a one-piece structure.

The jacket or cap 1 may be provided with an outwardly opening suction valve as shown, adapted to relieve tension of vacuum in the compression chamber when the cylinder is moved out upon the piston.

Figure 1:
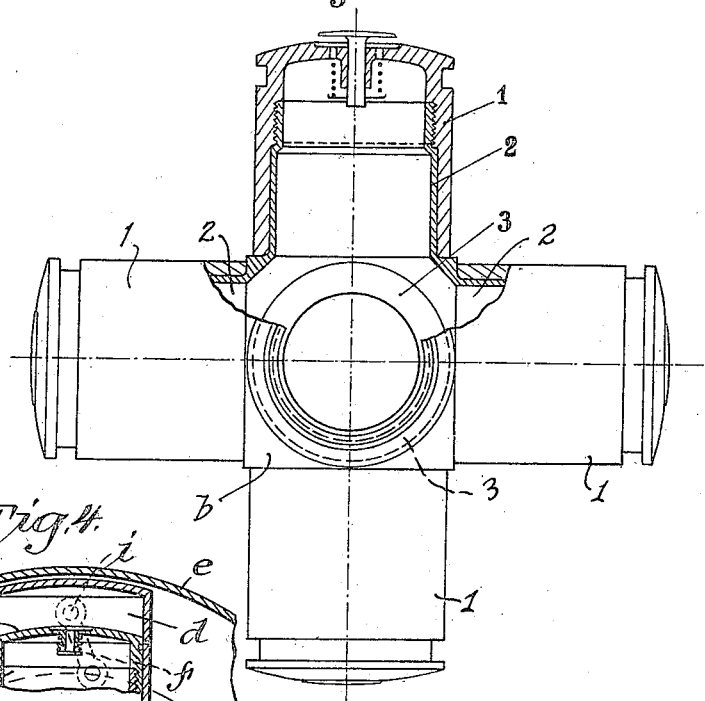
Figure 4:
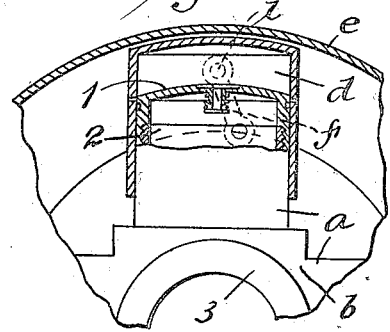
Fig. 4 is a fragmentary sectional view taken in the plane of a wheel constructed according to this invention and showing the mounting of one spoke therein.
Figure 2:
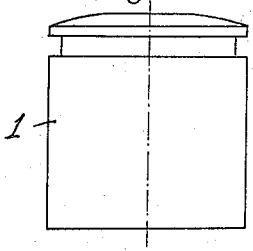
Fig. 2 is a detail side elevation of one of the jackets or caps employed.

The piston structure of this invention may be advantageously used in a wheel of the construction shown in Fig. 4 and wherein the rim $e$ carries a plurality of cylinders $d$ in which the pistons $a$ are fitted. The cylinders $d$ are connected to the rim $e$ by links $f$ which are pivoted to the cylinders $d$ at $i$ and are pivoted at their opposite ends to the rim $e$ at the inner edge thereof.

Such construction permits the cylinder $d$ to slide upon the piston $a$ and pressure exerted either upon the cylinder $d$ or upon the rim $e$ is transmitted longitudinally through the link $f$. The above means of securing the cylinders to the rim forms no part of this invention, but is set forth as exemplary of one use of the present novel piston and hub structure.

The jacket or cap 1 may be of aluminum, cast iron, bronze or other suitable material adapted to reduce the wear between the cylinder and the piston.

The provision of these caps or jackets 1 also admits of economical and easy manufacture of the parts as the opposite hub members may be readily pressed separately from sheet metal and may then be assembled and held radially in proper position by the several caps or jackets 1 which are employed.

What is claimed is:

1. In a pneumatic cushioned wheel, a hub provided with radial extensions and each extension being externally screwthreaded, caps detachably fitted over said extensions and engaging the screw threads thereof for securely holding the caps over said extensions, a rim enclosing the hub with its extensions, and cylinders carried by the rim engaging over said caps and co-operating therewith for pocketing air within the cylinders.

2. In a pneumatic cushioned wheel, a rim, a hub composed of a pair of opposed sections provided with complemental projecting portions, caps detachably secured from said complemental projecting portions to hold the same and the hub parts together, and a plurality of cylinders carried by the rim, said caps being adapted to engage in said cylinders and compressed air therein.

In testimony whereof I affix my signature in presence of two witnesses.

BORIS v. LOUTZKOY.

Witnesses:
 PAUL GORU,
 A. SCHNELL.